(12) United States Patent
Jarisch et al.

(10) Patent No.: US 9,149,129 B2
(45) Date of Patent: *Oct. 6, 2015

(54) CAPSULE LOADING DEVICE FOR FEEDING A CAPSULES DISPENSING MACHINE

(71) Applicant: NESTEC S.A., Vevey (CH)

(72) Inventors: Christian Jarisch, Paudex (CH); Alfred Yoakim, St.-Legier-la-Chiesaz (CH)

(73) Assignee: Nestec S.A., Vevey (CH)

( * ) Notice: Subject to any disclaimer, the term of this patent is extended or adjusted under 35 U.S.C. 154(b) by 145 days.

This patent is subject to a terminal disclaimer.

(21) Appl. No.: 13/936,720

(22) Filed: Jul. 8, 2013

(65) Prior Publication Data

US 2013/0292404 A1 Nov. 7, 2013

Related U.S. Application Data

(63) Continuation of application No. 11/568,623, filed as application No. PCT/EP2005/004369 on Apr. 22, 2005.

(30) Foreign Application Priority Data

May 5, 2004 (EP) .................................... 04010644

(51) Int. Cl.
*A47F 1/08* (2006.01)
*B65G 57/28* (2006.01)
*B65G 59/08* (2006.01)

(52) U.S. Cl.
CPC . *A47F 1/08* (2013.01); *B65G 57/28* (2013.01); *B65G 59/08* (2013.01)

(58) Field of Classification Search
CPC ................................ B65G 57/28; B65G 59/08

USPC ......... 221/188–189, 290, 285, 175–182, 185, 221/287

See application file for complete search history.

(56) References Cited

U.S. PATENT DOCUMENTS 1,582,451 A 4/1926 Cooley
1,808,658 A * 6/1931 Hosier .......................... 221/189

(Continued)

FOREIGN PATENT DOCUMENTS

EP 1247481 10/2002
GB 339092 12/1930

(Continued)

OTHER PUBLICATIONS

Japanese Office Action dated Dec. 27, 2010 citing the JP references listed in this submission relating to JP 2007-511932, 8 pages.

(Continued)

*Primary Examiner* — Michael K Collins
(74) *Attorney, Agent, or Firm* — K&L Gates LLP (57) ABSTRACT

Device for facilitating the loading of capsules into a machine for dispensing capsules or for preparing drinks based on these capsules comprising: a detachable tube, containing stacked capsules furnished with an opening for the capsules to pass through the tube, means of aligning the tube allowing the tube to be aligned through a capsule receiving zone for the capsules to descend by gravity into this zone. The alignment means comprise means for retaining the capsules in their stack when the tube is moved with its opening oriented downwards, in the direction of the position in which the tube is aligned with the reception zone.

17 Claims, 7 Drawing Sheets

(56) References Cited

U.S. PATENT DOCUMENTS

| | | | |
|---|---|---|---|
| 2,151,315 A | | 3/1939 | Colomy |
| 2,243,895 A | | 6/1941 | Brown |
| 2,919,051 A | * | 12/1959 | Wideburg et al. ............. 221/131 |
| 4,989,753 A | | 2/1991 | Brogna et al. |
| 5,242,080 A | * | 9/1993 | Kroon et al. .................. 221/113 |
| 5,361,937 A | | 11/1994 | Wiese |
| 5,523,816 A | | 6/1996 | Sherman et al. |
| 6,240,832 B1 | | 6/2001 | Schmed et al. |
| 6,398,072 B1 | | 6/2002 | Nitta et al. |
| 6,595,106 B2 | | 7/2003 | Eugster |
| 6,902,084 B2 | | 6/2005 | Bauman |
| 7,051,646 B2 | | 5/2006 | Della Pietra et al. |
| 7,270,248 B2 | | 9/2007 | Schroeder |
| 7,413,176 B2 | | 8/2008 | Hirata et al. |
| 8,561,838 B2 | * | 10/2013 | Jarisch et al. ................. 221/177 |
| 2002/0031588 A1 | | 3/2002 | Eugster |
| 2004/0000559 A1 | | 1/2004 | Bauman |
| 2004/0129145 A1 | | 7/2004 | Denisart et al. |
| 2006/0241807 A1 | | 10/2006 | Daniels et al. |
| 2007/0170203 A1 | | 7/2007 | Jarisch et al. |
| 2007/0246478 A1 | | 10/2007 | Jarisch et al. |
| 2007/0246480 A1 | * | 10/2007 | Jarisch et al. ................. 221/177 |

FOREIGN PATENT DOCUMENTS

| | | |
|---|---|---|
| GB | 2302327 A | 1/1997 |
| JP | 63-044595 | 12/2010 |
| WO | WO9944479 | 9/1999 |
| WO | WO03026467 | 4/2003 |

OTHER PUBLICATIONS

European Application No. 04010645.2 filed May 5, 2004 entitled: "Dwevice for selecting capsules contained in a stack."

* cited by examiner

CAPSULE LOADING DEVICE FOR FEEDING A CAPSULES DISPENSING MACHINE

PRIORITY CLAIM

This application is a continuation of U.S. application Ser. No. 11/568,623, filed Nov. 3, 2006, which is a National Stage of International Application No. PCT/EP2005/004369 filed Apr. 22, 2005, which claims priority to European Patent Application No. 04010644.5, filed May 5, 2004, the entire contents of which is incorporated herein by reference thereto.

BACKGROUND

The invention relates to a device for loading capsules intended for the feeding of machines, dispensers, display units or other devices for the dispensing of such capsules and/or for the preparation of food products based on these capsules, such as coffee machines or other machines.

In the food field, the use of systems for preparing food products based on capsules, such as drinks dispensers, is expanding rapidly due to the many advantages that these systems generally bring. Such systems may be drinks dispensers, for example, which work by using capsules containing a base for preparing a drink. The consumer may prepare a drink for himself by using these capsules simply, rapidly and most of the time with a minimum of intervention on his part for preparation and/or cleaning.

These capsules may be, for example, dosed packages of extremely varied configuration, size and/or nature. These may be capsules made of plastic film, filter paper, aluminium or composite laminate and may be in the form of a lens, a beaker or other forms.

In most of the known systems, the capsules are supplied in closed packs such as cardboard boxes or flexible or rigid plastic packs that are separate from the machines themselves. The user takes a capsule from the chosen pack and inserts the capsule into the preparation machine which carries out the preparation such as by dissolving, extracting or percolating the product contained in the capsule with a diluent such as water.

In certain cases, there are capsule dispensers associated with or yet integrated into the preparation machines. Specifically there is a requirement for building stocks of capsules in order to ensure supplies with a minimum of interruption and offer the consumer a choice. The capsules may further be available on demand as in the form of a display unit or a dispenser, with or without payment system, in which the consumer has access to the capsule which he can then take from the dispenser then insert in a machine for preparing the food speciality, for example, for preparing a hot or cold drink.

It may further involve a device which is directly integrated into the machine for preparing the food product and, in this case, the capsule is selected directly and the. product is prepared in the same machine without direct contact between the capsule and the consumer. The capsule is then picked up by mechanical means to be transported from the storage zone to the preparation means such as an extraction or dissolving chamber for example, where the product contained in the capsule may be extracted or dissolved.

For example, U.S. Pat. No. 6,595,106 relates to a magazine for capsules used to store several capsules stacked one upon the other. The capsules may thus be removed from the magazine on demand via an opening made in the base of the magazine. A drawback arises in that, to reload the magazine, the capsules must be inserted into the magazine individually in a slot provided for this purpose. The reloading process is therefore long and not very practical. This system therefore does not lend itself very well to receiving large series of capsules and to an overcomplex automation of the system.

Patent application EP 1 247 481 A1 sets forth a drinks extraction device comprising an integrated capsule loading system. Such a system is particularly practical because it can be used to automatically feed an extraction system with capsules to be extracted by means of a turntable positioned in direct relation with the extraction system. Such a device comprises packs in the form of detachable tubes for storing capsules which match with tubular supports mounted on a rotating base. However, loading the packs into the tubular supports poses a problem.

SUMMARY

The present invention relates to a capsule loading device which responds to the requirements and problems of the prior art.

Thus, one object of the device of the invention is to allow the loading of capsules into a machine of any kind, such as a capsule dispenser and/or a food product preparation machine, such as a drinks dispenser, which is easy and quick to use. One object is thus to reduce the loading time and to make loading more practical. Another object is to be able to also allow the removal or exchange of capsules stacked in the storage reserve at any time and without scattering the capsules or without dropping them.

To achieve these objectives and others, the invention relates to a capsule loading device to form a reserve of stacked capsules, in particular, capsules suitable for being dispensed in an order beginning from the bottom of the capsule reserve. The device thus comprises a detachable tube containing stacked capsules furnished with an opening for the capsules to pass through the tube and means of aligning the tube allowing the tube to be aligned with a capsule receiving zone for the capsules to descend by gravity into this zone. The invention consists in providing alignment means which comprise retention means configured to retain the capsules in their stack, at least partially in the tube, when the tube is moved with its opening oriented downwards, towards the position in which the tube is aligned with the reception zone.

Such a configuration thus makes it possible to feed capsules into a reception zone of any kind, from an open tube without risking scattering the capsules or wrongly ordering the latter in the reception zone. The loading process is thus simplified and quick. The tube may also thus be of a simple and cost-effective design.

According to one aspect of the invention, the capsule retention means comprise a retention surface which is juxtaposed relative to the opening of the tube to support the capsules when the tube is tilted, from a position in which the opening of the tube is in a position facing upwards or substantially horizontal to a position of alignment in which the opening of the tube is facing downwards and aligned with the reception zone allowing the capsules to pass into the reception zone.

Such a retention surface is preferably a surface having an arced shape which allows for the tilting movement of the tube in the loading operation before the placing in alignment.

Thus, preferably the retention surface terminates in a passage arranged substantially horizontally which delimits the entrance of the reception zone. Such a passage allows the capsules to communicate with the reception zone. Such a zone may be a nondetachable portion of tube forming a housing for the buffer storage of capsules or yet a zone for dispensing capsules or other items.

Preferably, the tilting of the tube is guided so as to facilitate the operation of loading without disordering, losing or scattering the capsules and thereby to ensure the alignment. For this, the alignment means comprise means for guiding the tube in tilting that are configured in association with the retention surface to keep the stack of capsules constantly pressing on the said surface. The guidance then takes place so that the capsules are constantly retained before the tube is aligned with the reception zone. Thus, the means for guiding in tilting are preferably configured to cause the tube to pivot about an axis of rotation. The tilting takes place then by rotating the tube about this axis of rotation. The axis of rotation may be placed in a position relative to the tube which is substantially to the rear of the opening and which virtually traverses the latter. In this manner, the opening moves in an arc of a circle corresponding substantially to the shape of the retention surface. This axis is preferably substantially in intersection with the central axis of the tube or slightly offset in order to move all the points of the opening substantially the same distance relative to the axis and facilitate the alignment with the reception zone, particularly when the. latter is of a shape complementing that of the tube, such as of circular shape, for example. Thus, the retention surface is preferably an arced surface having as its centre the axis of rotation of the guidance means in tilting. The arced surface has a radius which is -a function of the geometry of the capsules to be retained. Notably, the size of the radius must be such that the capsules preferably rest against the retention surface, on their central portion, rather than on their edges; this is so in order to avoid a deformation of the edges, where the pinching usually occurs between the jaws of the extraction system and hence the seal during the preparation of the drink in the coffee or other machine. Furthermore, the radius must not be too big in order to keep a relatively compact device.

Structurally, the guidance means in tilting preferably comprise a tube support into which the tube is inserted. Thus, it is easy to achieve the pre-positioning of the tube in its support in order then to carry out the tilt loading. The support is then mounted rotatably about the axis of rotation on a base of the alignment means which may be formed of two lateral wings positioned either side of the retention surface. In order to allow a free pivoting through a sufficient angle to pass from the position for inserting the tube into the support to an alignment position, the support is in the shape of a ring terminating in edges, oriented towards the retention means, which have a shape of sinusoidal revolution. Such a shape allows the support and the tube attached thereto to rotate freely, through a sufficient angle without blockage, to a position of alignment and allows the capsule stack to be brought sufficiently close to the retention surface while preventing jams. Other constructions are possible, but the latter has the advantage of being of relatively simple and reliable design and prevents jams.

The tube may be attached in the tube support by attachment means housed in the tube support and interacting with complementary attachment means of the tube. Such means may be of any type such as screw means or clipping means or socket means such as bayonet systems or equivalent systems.

In a preferred embodiment, the tube support has bearing means in collar form which press against the retention surface when the tube is in the position of alignment with the reception zone. Thus, no complex alignment means is necessary other than an appropriate arrangement of surfaces making it possible to achieve a correct alignment for the capsules to pass into the reception zone.

In a preferential embodiment, the reception zone comprises a tube portion forming a buffer zone to receive capsules.

Complementary bearing means may be provided in the position of alignment of the opening with the reception zone. These means may take the form of a surface complementary to the surface of the tube and protruding onto a portion of the length of the tube and in a manner juxtaposed to the tube when the latter is in the position of alignment with the reception zone.

The tube may take the form of a detachable, discardable or recyclable pack, able to house a series of capsules, which comprises rapid connection means suitable for connecting the tube to the alignment means. These rapid connection means are present at the rear of the periphery of the tube opening. In this manner, the tube may be connected firmly to the alignment means. These means may also serve to connect a cap being used to block off the opening during transport and before loading. This may involve screw or other means as previously described. When a pack is involved, the tube is advantageously formed of one piece in blow-moulded plastic such as PET or other plastic that may be formed according to the same technology. The tube is preferably transparent in order to inform the user on the degree to which the device is filled with capsules. The reception zone may also be at least partly transparent for the same reason.

These features and their advantages and others possible will be better understood in the light of the following description and the following drawings:

DETAILED DESCRIPTION

Figure 1:
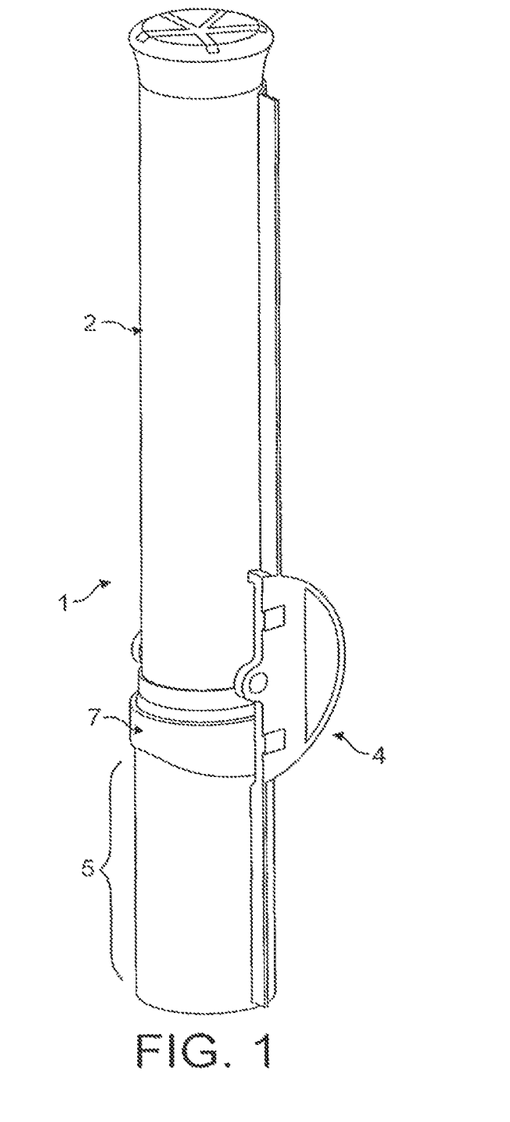
FIG. 1 is a view in perspective of a capsule loading device according to the invention in the position of alignment corresponding to the storage of the capsules.
Figure 2:
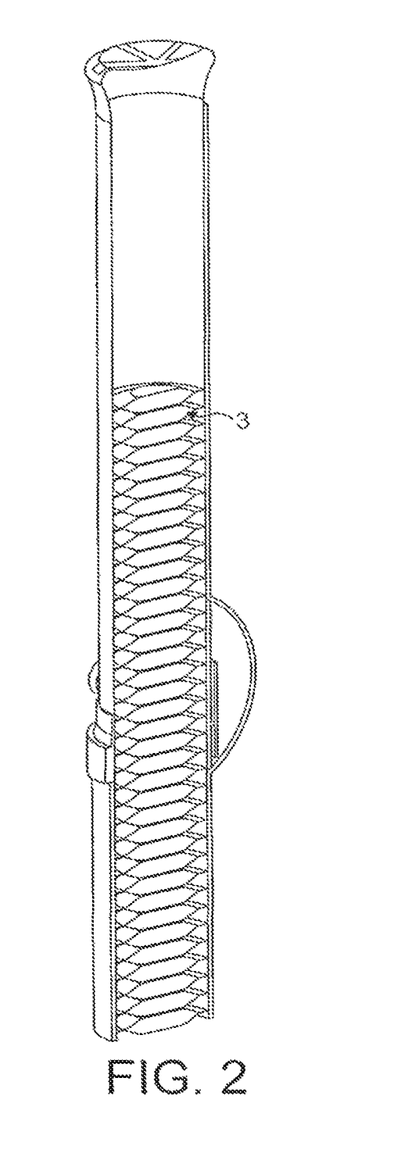
FIG. 2 is a view in perspective and in section showing the capsules stacked in the device in the position of FIG. 1.
Figure 3:
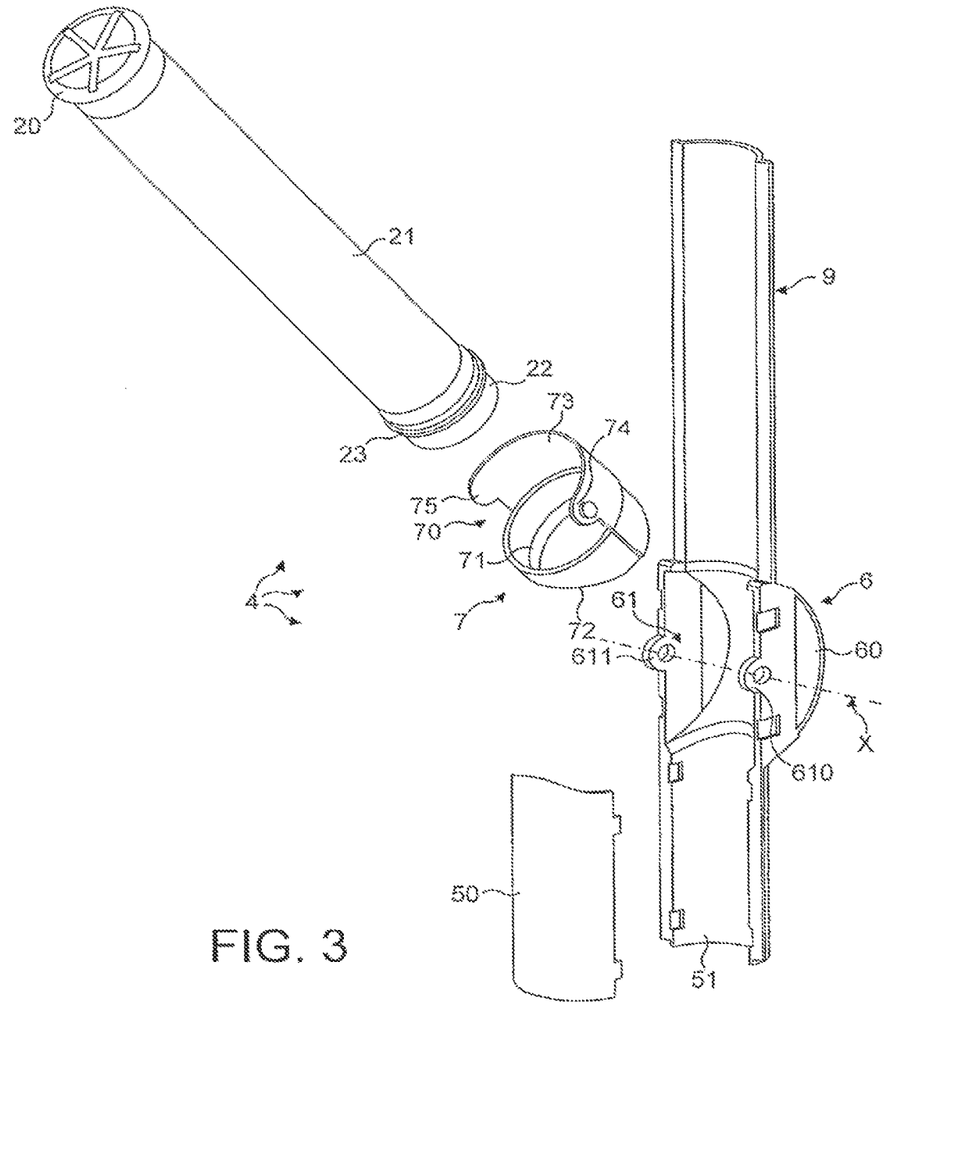
FIG. 3 is an exploded view in perspective of the device.

The loading device 1 according to the invention is shown in FIGS. 1 and 2 in the position of alignment and is represented in an exploded view in FIG. 3. The device consists of a detachable tube 2 serving as a reserve for a series of capsules 3 and alignment means 4 with a reception zone 5. Capsules 8 are stored in a stack in the tube.

The term "capsule" means any type of portioned and packaged food products. It may involve portions of coffee, tea, powdered chocolate, plant extracts, milk, cream or a substitute, soups, culinary products or their combinations. The pack may use materials of different kinds such as plastics, metals, papers or cards, and materials that are composites of these materials. The shape of the capsules may be variable. They may be lens, parallelepipedal, oblong, goblet shaped or other shapes.

The term "tube" should be interpreted broadly and includes any type of container of various shapes. It is preferable however to provide a tube which comprises—a bottom 20, a body 21 of sufficient length to allow the storage of a sufficient number of capsules, a cap 22 removably closing off an opening opposite the bottom, which is necessary for the removal of the capsules and connection means 23 allowing a connection of the tube to the alignment means, as will be described in greater detail hereinafter. The tube has a shape which is suited to the cross section of the capsules. Thus, when the capsules are of circular shape, as is shown, the tube itself has a circular cross section. However, many other shapes of capsules/tube may be envisaged without departing from the scope of the invention.

The tube may be a discardable or recyclable pack formed in a plastic, cellulose or composite material. The tube may be made by any appropriate technique such as moulding, cutting-bending-bonding or other. Preferably, the main portion of the tube, excluding the cap, consists of a plastic that can be blow-moulded. For this, the tube is produced by making a preform in plastic by extrusion or moulding in a mould conferring the size and shape of the preform. Then, the preform is drawn and blow-moulded in a second mould of a size and shape corresponding to the final shape of the tube. The preform may be drawn by mechanical stretching by means of a blowing iron then by blow-moulding by means of a pressurized gas or by blow-moulding only. The advantage of such a technology lies in the possibility of producing a thin, transparent or translucent reloading tube with precise dimensions allowing it to fit correctly in the alignment means. Finally, such a technology is also economical when applied to long production runs.

According to the invention, the alignment means 4 comprise means 6 of retaining the capsules in the form of a retention surface 60 arranged so as to retain the capsules when the tube is tilted from a position in which the opening of the tube is substantially horizontal or oriented upwards to a position in which the opening is then oriented downwards in a position of alignment as is shown in FIG. 2; then allowing the said capsules to pass through the reception zone.

The alignment means preferably also comprise guidance means 7 in tilting serving to guide the tube during the tilting of the latter into the alignment position. These means are arranged in association with the retention means 6 so that the stack of capsules may press against the retention surface 60 at the moment of the tilting of the tube.

The guidance means in tilting 7 comprise a tube support 70 comprising connection means 71 complementing the connection means 23 of the tube. The connection means 23, 71 may be of any type possible such as an arrangement with screws or a mechanical socket fit of the bayonet type or any equivalent means. The tube support preferably has a shape in which the tube can be inserted or nested in order to produce a firm fit. It comprises edges 72 delimiting an opening with a cross section allowing the capsules to pass through. The support is mounted rotatably about an axis of rotation X on a base 61 of the retention means comprising two opposite lateral wings 610, 611. The lateral wings extend either side of the retention surface 60 and comprise openings allowing the connection of the tube support 70 along the axis X. The tube support may be mounted permanently on the base or mounted detachably. In the latter case, the tube support 70 may be mounted on the tube 2 also detachably or permanently.

The retention surface 60 and the tube support 70 have particular shapes making it possible to provide a rotation of the tube and of the support along the said retention surface through a sufficient angle to the alignment position. Thus, the retention surface is preferably an arced surface whose centre has as its axis, the axis X. The tube support has an edge 72, oriented on the side of the retention surface, which, in its form of revolution, has a sinusoidal edge. Such a form provides an optimal closeness of the tube support edge along the retention surface 60 when the tube is tilted rotatably; this permanently closes the tube support and prevents any possibility of the capsules slipping over the sides. Specifically, the capsule stack easily tends to tilt to one side or the other and any opening could create a passage beneath the capsules and lead to some of them blocking the system.

The tube support also has a collar 73 oriented on the side of the retention means 6 having the function of serving as an abutment means when the tube and its support reach the position of alignment with the reception zone. The collar is extended laterally by side lugs 74, 75 which support the pivoting attachment means having the function of connecting to the lateral wings 610, 611 of the retention means. Naturally, the abutment means and the surfaces to which the attachments means attach may take other shapes while providing the same function without for all that departing from the scope of the invention.

It may be pointed out that the guidance means in tilting 7 are optional although extremely useful for ensuring a fast and problem-free loading. These means could in effect be dispensed with and the tilting could be provided manually by simply pressing the tube against the retention surface 60. In this case, provision must be made for the tube to have an opening whose edges are also of sinusoidal shape, or for the adaptation of a tube support whose edges have this same shape. In the latter case, the tube support does not require means of rotation that are attached to the retention means 6 since the tilting movement is carried out by manual guidance while keeping the opening along the retention surface 60.

The retention means are extended upwards by bearing means 9 on which the tube in the alignment position can bear. Such means may, for example, be a half-portion of tube of a shape complementing the external half-surface of the tube. Bearing means of different configuration may be envisaged such as rods, strips, grid or other means.

The reception zone 5 for the capsules is situated below the retention means; in the extension of the retention surface 60. The reception zone may be a zone for storing a certain number of capsules. Thus, it may comprise a tube portion forming a buffer zone capable of receiving a certain number of capsules. In this way, when a tube 2 is removed, the device may contain capsules capable of being dispensed or transferred. The edges of the tube portion 5 are cut away in order to match the shape of the edges of the tube support 70 to allow a clean junction of the surfaces, particularly of the internal surfaces, and thus prevent any capsules getting stuck when discharged into the reception zone. There may be housed beneath the tube portion 5 a capsule selection device having the function of individually releasing the capsules (not shown). A preferential embodiment of a device is described in European application No. 04010645.2 filed on 5 May 2004 and entitled: "Device for selecting capsules contained in a stack" and its entire content is here incorporated by reference.

In the illustrated embodiment, the tube portion is formed of two half-tubes 50, 51 connected by mechanical means of connection such as clipping elements. The half-tube 51 for example may be formed in a single piece of injected plastic with the retention means 6 and the bearing means 9, for reasons of economy and ease of assembly.

Instead of a tube portion, the reception zone may be replaced by other buffer means or mechanical means of stopping and/or of transferring the capsules.

The operating principle of the loading device according to the invention will now be described with reference to FIGS. 4 to 7.

Figure 4:
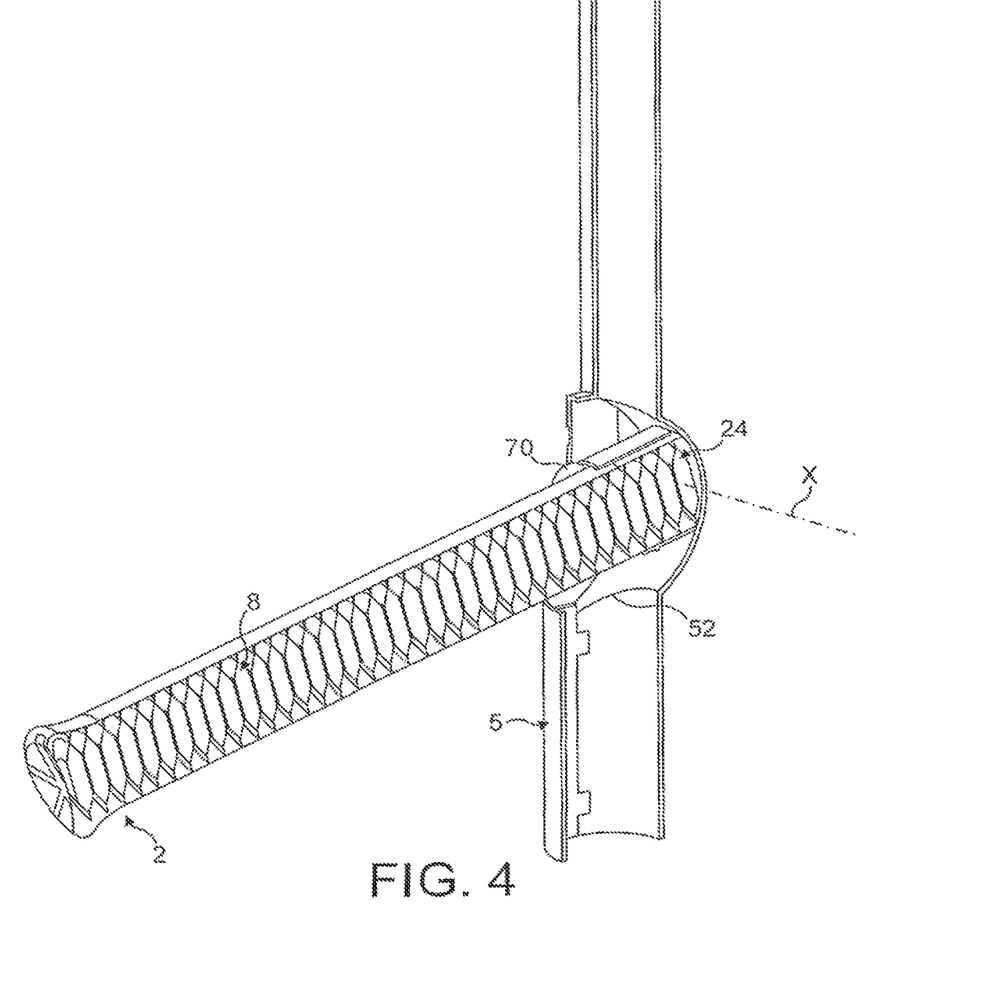
FIG. 4 is a view in section of the device in the position of insertion of the detachable tube to carry out the reloading of capsules in the device.

A new refill of capsules in the form of a tubular pack 2, previously described, containing a series of capsules is inserted into the alignment means 4 after the cap 22 has been removed in order to free the opening 24 of the tube 2. The tube is thus connected to the tube support 70 by means of the connection means 23, 71. The connection may be achieved by screwing, for example, the tube onto the tube support which is held in position on the base by the complementary pivot junctions 74, 75, 610, 611. As shown in FIG. 4, the tube support is then oriented downwards so as to orient the tube with its opening upwards and prevent the capsules being accidentally spilled before the reloading. An uncontrolled spill into the tube portion 5 may result in an incorrect positioning of the capsules that may lead to the blockage of the downstream systems of the device, particularly, of the selection device.

Figure 5:
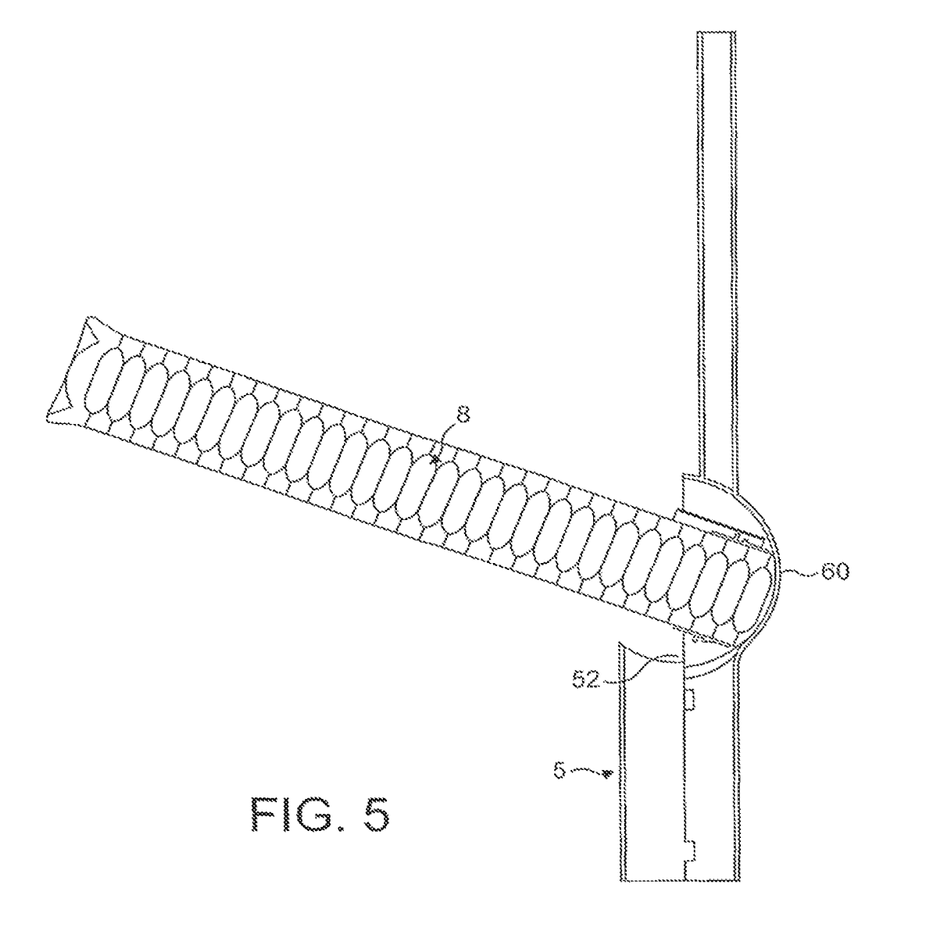
FIG. 5 is a plan view in section showing the means of retaining the capsules in the intermediate position when the tube is tilted.
Figure 6:
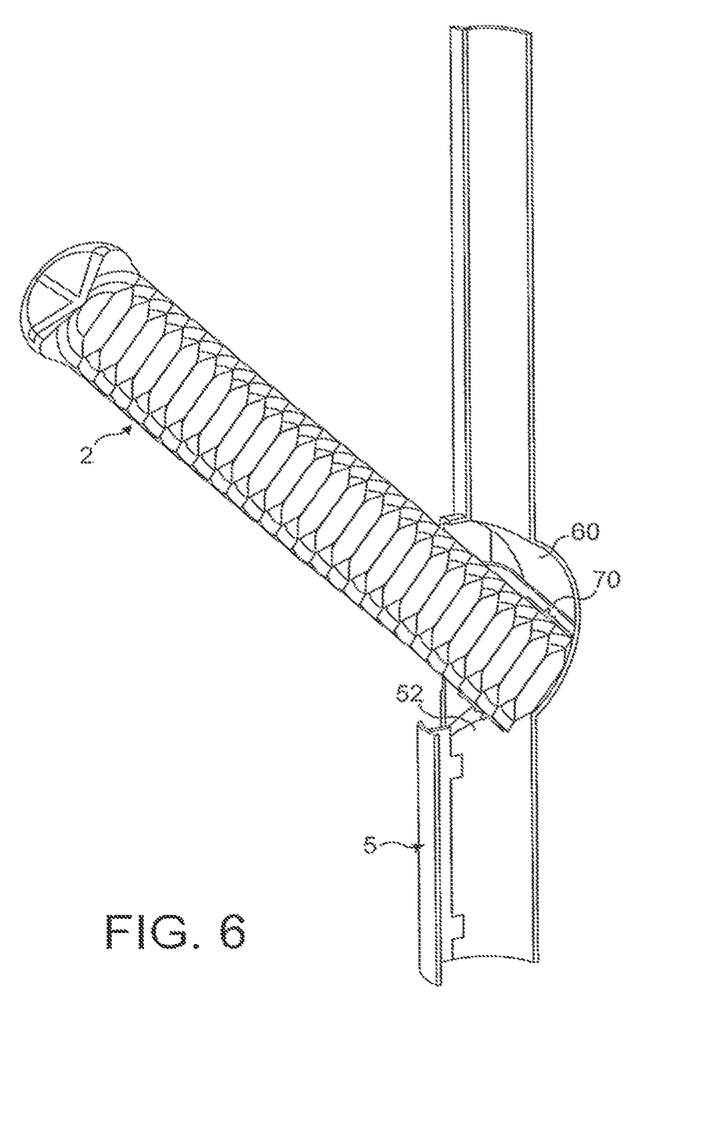
FIG. 6 is a view in perspective and in section of the device in another intermediate position.
Figure 7:
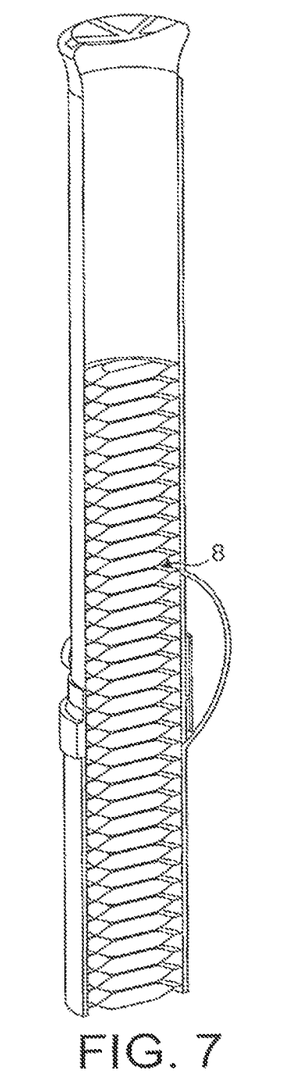
FIG. 7 is a view in perspective and in section of the device in the alignment position.

Once the coupling between the tube and the tube support has been achieved, the tube 2 may be tilted from top to bottom about the axis of rotation X on which the tube support 70 is mounted as shown in FIG. 5. The tilting movement has the effect of orienting the tube opening downwards and causing the capsules 8 to descend until they make contact with the first capsule on the stack on the retention surface 60 of the retention means. The stack is then kept in place in the tube during the rotary movement (FIGS. 5 and 6).

The tube support abuts against the retention surface 60 when the tube is correctly aligned with the lower tube portion. During the alignment, the tube opening is moved in coaxial manner with the passage 52 of the reception zone and the capsules may descend by gravity through the said passage.

Figure 8:
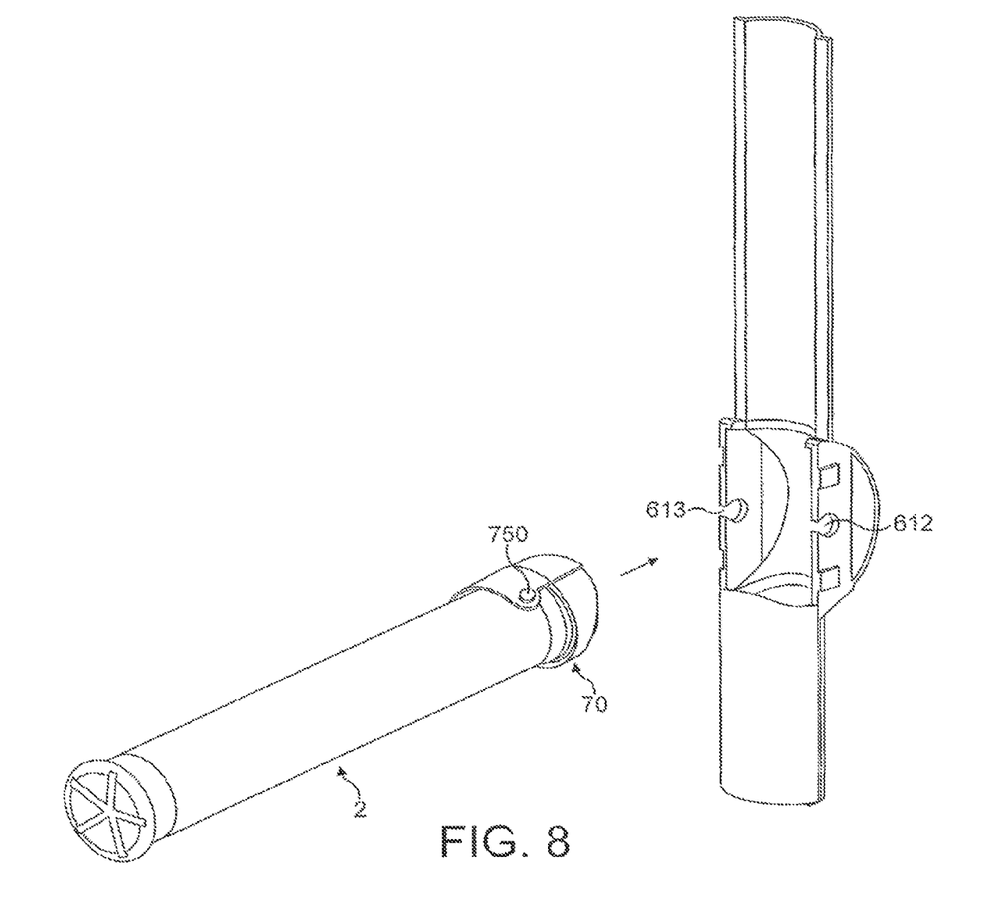
FIG. 8 is a view in perspective of a different embodiment of the device of the invention.

The embodiment in FIG. 8 represents a variant of the device of the invention in which the tube 2 comprises a portion of the guidance means in tilting which are connected in detachable manner to the alignment means 4. In particular, the tube 2 and the tube support 70 are rendered fixedly attached. The tube support comprises pivot means, such as a pair of lugs 750, which is coupled detachably into the reception means such as slots 612, 613. The slots are of open shape so that the lugs may be inserted while the tube opening is oriented upwards. Once the lugs are in place in the slots, the tube and its support may be tilted while keeping the lugs in the slots until the tube is aligned with the reception zone.

The invention has been described by way of preferred examples. However, it is understood that the invention may comprise many variants or equivalents within the capabilities of those skilled in the art.

The invention is claimed as follows:

1. Capsule loading device comprising:
   a detachable tube comprising stacked capsules, the tube having an opening for the capsules to pass through the tube, the capsules being stacked in a single straight line relative to each other and the opening such that the capsules and the opening are substantially co-linear;
   an alignment member for aligning the tube allowing the tube to be aligned with a capsule receiving zone for receiving the capsules as they descend by gravity, the alignment member comprising means for retaining the capsules in a stack when the tube is moved with its opening oriented downwards, in a direction of a position in which the tube is aligned with the capsule receiving zone, the tube being detachable from the alignment member, the means for retaining the capsules comprising an arc shaped retention surface; and
   a guiding member configured to cause the tube to pivot about an axis of rotation and forming a tube support into which the top end of the tube is inserted, the tube support being mounted rotatably about the axis of rotation on a base of the alignment member comprising two lateral wings positioned on either side of the retention surface, the capsule receiving zone comprising a tube portion forming a junction with the tube support when the tube is aligned with the capsule receiving zone, and the tube portion of the capsule receiving zone forming a buffer storage housing to receive capsules.

2. Loading device according to claim 1, wherein the retention surface supports the capsules when the tube is tilted, from a position in which the opening of the tube is in a position facing upwards to a position of alignment in which the opening of the tube is aligned with the capsule receiving zone allowing the capsules to pass into the capsule receiving zone.

3. Loading device according to claim 2, wherein the retention surface terminates in a passage arranged substantially horizontally delimiting an entrance of the capsule receiving zone.

4. Loading device according to claim 1, wherein the arc shaped retention surface has as its center the axis of rotation of the guiding member, the arc shaped retention surface having an inner portion which faces the axis of rotation such that rotation of the tube constantly presses the stack of capsules on the inner portion of the retention surface.

5. Loading device according to claim 1, wherein the tube support comprises attachment means which interact with complementary attachment means of the tube.

6. Loading device according to claim 4, wherein the tube support comprises bearing means in a collar form which press against the retention surface when the tube is in a position of alignment with the capsule receiving zone.

7. Loading device according to claim 1, wherein the tube rests on bearing means in the position of alignment of the opening with the capsule receiving zone, the bearing means comprising a surface complementary to the exterior surface of the tube.

8. Loading device according to claim 1, wherein the tube forms a detachable pack for a series of capsules which comprises rapid connection means for connecting the tube to the alignment member.

9. Loading device according to claim 8, wherein the tube has a first end in which the opening is located and a second end positioned opposite to the first end, the rapid connection means being located at a rear of the periphery of the tube opening between the opening and the second end of the tube.

10. Loading device according to claim 8, wherein the tube is formed of one piece of blow-moulded plastic.

11. Loading device according to claim 1, wherein the arc shaped retention surface has an inner portion which faces the axis of rotation such that rotation of the tube constantly presses the stack of capsules on the inner portion of the retention surface.

12. Detachable tube for use with stacked capsules, the tube having an opening for the capsules to pass through the tube comprising:
   an alignment member for aligning the tube allowing the tube to be aligned with a capsule receiving zone for receiving the capsules as they descend by gravity, the alignment member comprising means for retaining the capsules in a stack when the tube is moved with its opening oriented downwards, in a direction of a position in which the tube is aligned with the capsule receiving zone; and the tube comprising a body, a bottom, and an opening opposite the bottom, the tube containing a series of capsules in a single stack extending from a top capsule to a bottom capsule such that the bottom capsule is directly below all of the other capsules in the stack and the top capsule is directly above all of the other capsules in the stack, and the tube being detachable from the alignment member and the means for retaining the capsules comprising an arc shaped retention surface; and a guiding member configured to cause the tube to pivot about an axis of rotation and forming a tube support into which the top end of the tube is inserted, the tube support being mounted rotatably about the axis of rotation on a base of the alignment member comprising two lateral wings positioned on either side of the retention surface, the capsule receiving zone comprising a tube portion forming a junction with the tube support when the tube is aligned with the capsule receiving zone, and the tube portion of the capsule receiving zone forming a buffer storage housing to receive capsules.

13. Tube according to claim 12, comprising connection means allowing the connection of the tube to the alignment member of the device.

14. Tube according to claim 12, wherein the opening is closed off by a cap.

15. Tube according to claim 12, comprising a discardable or recyclable pack formed of a material selected from the group consisting of a plastic, cellulose and composite material.

16. Tube according to claim 15, wherein the body is formed of a transparent blow-moulded plastic.

17. A device for housing stacked capsules comprising:

a detachable tube containing capsules in a single stack extending from a top capsule to a bottom capsule such that each capsule except the bottom capsule rests on the capsule directly underneath in the stack, and the tube having an opening, the tube being aligned with a capsule receiving zone that receives the capsules as the capsules descend by gravity into the zone;

a retaining device for retaining the capsules in their stack when the tube is moved with its opening oriented in a downward direction, in the direction of a position in which the tube is aligned with the capsule receiving zone, the tube being detachable from a tube support and the retaining device comprising an arc shaped retention surface; and a guiding member configured to cause the tube to pivot about an axis of rotation and forming a tube support into which the top end of the tube is inserted, the tube support being mounted rotatably about the axis of rotation on a base comprising two lateral wings positioned on either side of the retention surface, the capsule receiving zone comprising a tube portion forming a junction with the tube support when the tube is aligned with the capsule receiving zone, and the tube portion of the capsule receiving zone forming a buffer storage housing to receive capsules.

* * * * *